H. S. HARRIS.
HARVESTER-REEL.
No. 191,960. Patented June 12, 1877.
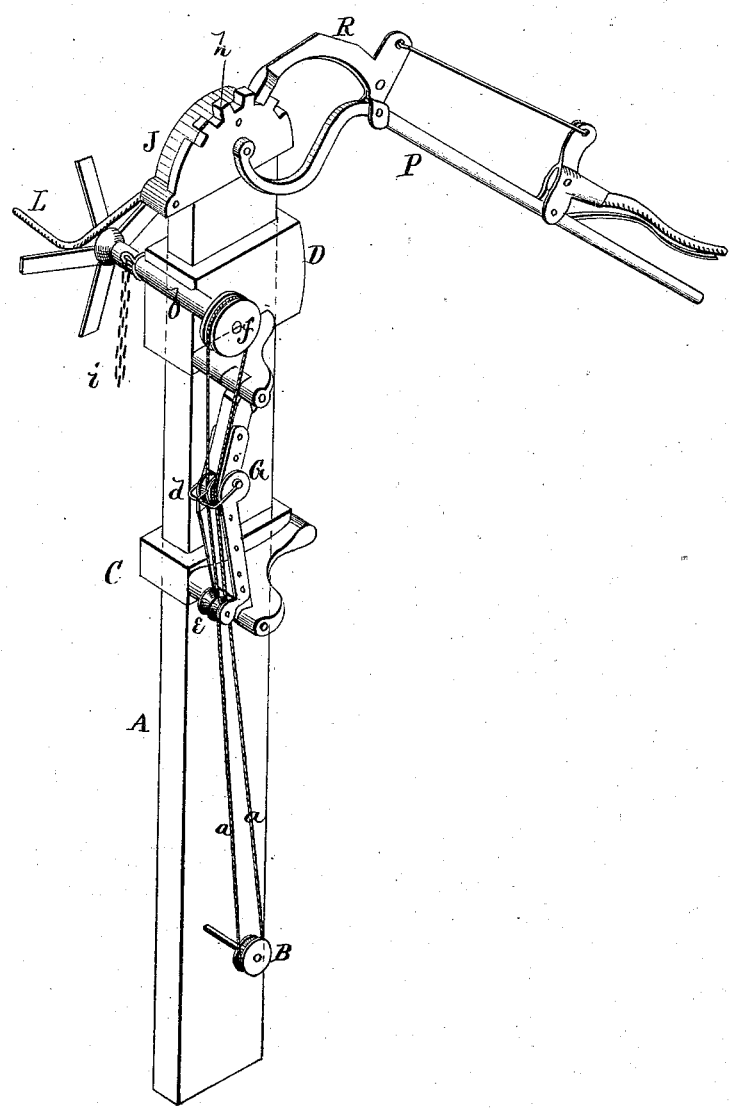
WITNESSES
Franck L. Durand
Henry N. Miller
INVENTOR
Hiram S. Harris
Alexander Mason
ATTORNEYS.

UNITED STATES PATENT OFFICE.

HIRAM S. HARRIS, OF VERSAILLES, KENTUCKY.

IMPROVEMENT IN HARVESTER-REELS.

Specification forming part of Letters Patent No. 191,960, dated June 12, 1877; application filed March 7, 1877.

*To all whom it may concern:*

Be it known that I, HIRAM S. HARRIS, of Versailles, in the county of Woodford, and in the State of Kentucky, have invented certain new and useful Improvements in Devices for Raising and Lowering Harvester-Reels; and do hereby declare that the following is a full, clear, and exact description thereof, reference being had to the accompanying drawing, and to the letters of reference marked thereon, making a part of this specification.

My invention relates to reaping-machines; and it consists in the construction and arrangement of mechanism for raising and lowering the reel, as will be hereinafter more fully set forth.

In order to enable others skilled in the art to which my invention appertains to make and use the same, I will now proceed to describe its construction and operation, referring to the annexed drawing, which represents a perspective view of my invention.

A represents the reel-staff. B is the chain-pulley on the power-wheel, around which the chain $a$ is passed.

C represents the lower head-block, made stationary on the staff A at the lowest point to cut grain. D represents the upper head block, carrying the shaft $b$, to which the reel is attached, said reel being constructed in any of the known and usual ways.

This head-block D is made movable up and down on the staff A, and is connected with the stationary head-block C by means of a jointed or elbow arm, G, pivoted to projections on the two head-blocks. In the lower joint of the arm G are two pulleys, $e$ $e$, and in the center joint or elbow are two other pulleys, $d$ $d$, over which the chain $a$ passes, and said chain then passes around a pulley, $f$, on the end of the reel shaft $b$.

By thus connecting the two head-blocks by means of the elbow containing pulleys over which the operating-chain passes, the reel may be raised or lowered without interfering with the chain, as the elbow accommodates itself to the position of the upper movable head-block, and always keeps the chain taut.

On top of the reel-staff A is a cap, J, with cogged segment $h$ formed thereon. Through the center of this cap is passed a short shaft, provided at one end with an arm, L, connected by a chain, $i$, with the movable head-block D, and on the other end of the shaft is secured a lever, P, with spring dog or pawl R, to take into the cogged segment $h$ and hold the reel at any height desired.

This mechanism saves time, labor, and grain, because, as there is most generally some very high or low grain in the swath, and as by the usual mode it would be impossible to adjust the reel to suit it without stopping, thereby losing time and labor, the driver can, by my invention, set the reel at once as he drives along, thereby saving time, labor, and grain.

Having thus fully described my invention, what I claim as new, and desire to secure by Letters Patent, is—

1. The jointed arm or elbow G, connecting the movable head-block D, carrying the reel, with a stationary point on the reel-staff, and provided with the pulleys $d$ and $e$, as described, in combination with the chain $a$, driving-pulley B, and pulley $f$, on the reel-shaft, substantially as and for the purposes herein set forth.

2. The combination, with the reel-staff A, of the stationary head-block C, the movable head-block D, carrying the reel-shaft and reel, the pulleys $d$, $e$, $f$, and B, jointed arm G, chains $a$ $i$, arm L, lever P, notched segment $h$, and pawl R, all substantially as set forth.

In testimony that I claim the foregoing I have hereunto set my hand this 19th day of February, 1877.

HIRAM S. HARRIS.

Witnesses:
SWIFT DARNEAL,
R. B. GEORGE.